(12) United States Patent
Gelke et al.

(10) Patent No.: US 7,340,553 B2
(45) Date of Patent: Mar. 4, 2008

(54) DATA PROCESSING DEVICE AND METHOD FOR TRANSFERRING DATA

(75) Inventors: Hans-Joachim Gelke, Zürich (CH); Stefan Marco Koch, Zürich (CH); Anton Reding, Honau (CH)

(73) Assignee: NXP B.V., Eindhoven (NL)

( * ) Notice: Subject to any disclaimer, the term of this patent is extended or adjusted under 35 U.S.C. 154(b) by 161 days.

(21) Appl. No.: 10/548,344

(22) PCT Filed: Mar. 3, 2004

(86) PCT No.: PCT/IB2004/050197

§ 371 (c)(1),
(2), (4) Date: Sep. 7, 2005

(87) PCT Pub. No.: WO2004/081803

PCT Pub. Date: Sep. 23, 2004

(65) Prior Publication Data

US 2006/0224809 A1    Oct. 5, 2006

(30) Foreign Application Priority Data

Mar. 12, 2003    (EP) .................................. 03100629

(51) Int. Cl.
*G06F 13/36* (2006.01)
*G06F 13/40* (2006.01)
*G06F 13/12* (2006.01)

(52) U.S. Cl. ....................... 710/310; 710/307; 710/311

(58) Field of Classification Search ...................... None
See application file for complete search history.

(56) References Cited

U.S. PATENT DOCUMENTS

| 5,193,204 | A | * | 3/1993 | Qureshi et al. ................ 712/35 |
| 5,335,326 | A | * | 8/1994 | Nguyen et al. ............. 710/306 |
| 5,642,482 | A | | 6/1997 | Pardillos |
| 5,761,450 | A | * | 6/1998 | Shah ........................... 710/107 |
| 5,787,497 | A | * | 7/1998 | Tokura et al. ............... 711/220 |
| 5,835,742 | A | * | 11/1998 | James et al. ................. 710/310 |
| 5,916,296 | A | | 6/1999 | Honda |
| 6,199,127 | B1 | * | 3/2001 | Ajanovic ..................... 710/100 |
| 6,212,590 | B1 | | 4/2001 | Melo et al. |
| 6,266,723 | B1 | | 7/2001 | Ghodrat et al. |
| 6,279,087 | B1 | | 8/2001 | Melo et al. |
| 6,298,407 | B1 | * | 10/2001 | Davis et al. ................. 710/314 |
| 6,405,276 | B1 | * | 6/2002 | Chen et al. .................. 710/310 |
| 6,715,023 | B1 | * | 3/2004 | Abu-Lebdeh et al. ........ 710/317 |
| 6,996,659 | B2 | * | 2/2006 | Lupien et al. .............. 710/315 |

OTHER PUBLICATIONS

PCI Special Interest Group; "PCI-X Addendum to the PCI Local Bus Specification"; PCI Special Interest Group; Revision 1.0; Sep. 22, 1999; pp. 88-90.*

* cited by examiner

*Primary Examiner*—Paul R. Myers
*Assistant Examiner*—Ryan M Stiglic

(57) ABSTRACT

The data processing device according to the invention comprises a first processing unit (1) linked to a first bus (5), a second processing unit (2) linked to a second bus (6), a first bus master (3) linked to the first bus (5), a second bus master (4) linked to the second bus (6), a first and a second communication channel (7, 20, 8, 21) linking the first and the second bus master (3, 4) with each other, and a control unit (9) controlling the data transfer between the first and the second bus master (3, 4) via the first and the second communication channel (7, 20, 8, 21).

11 Claims, 1 Drawing Sheet

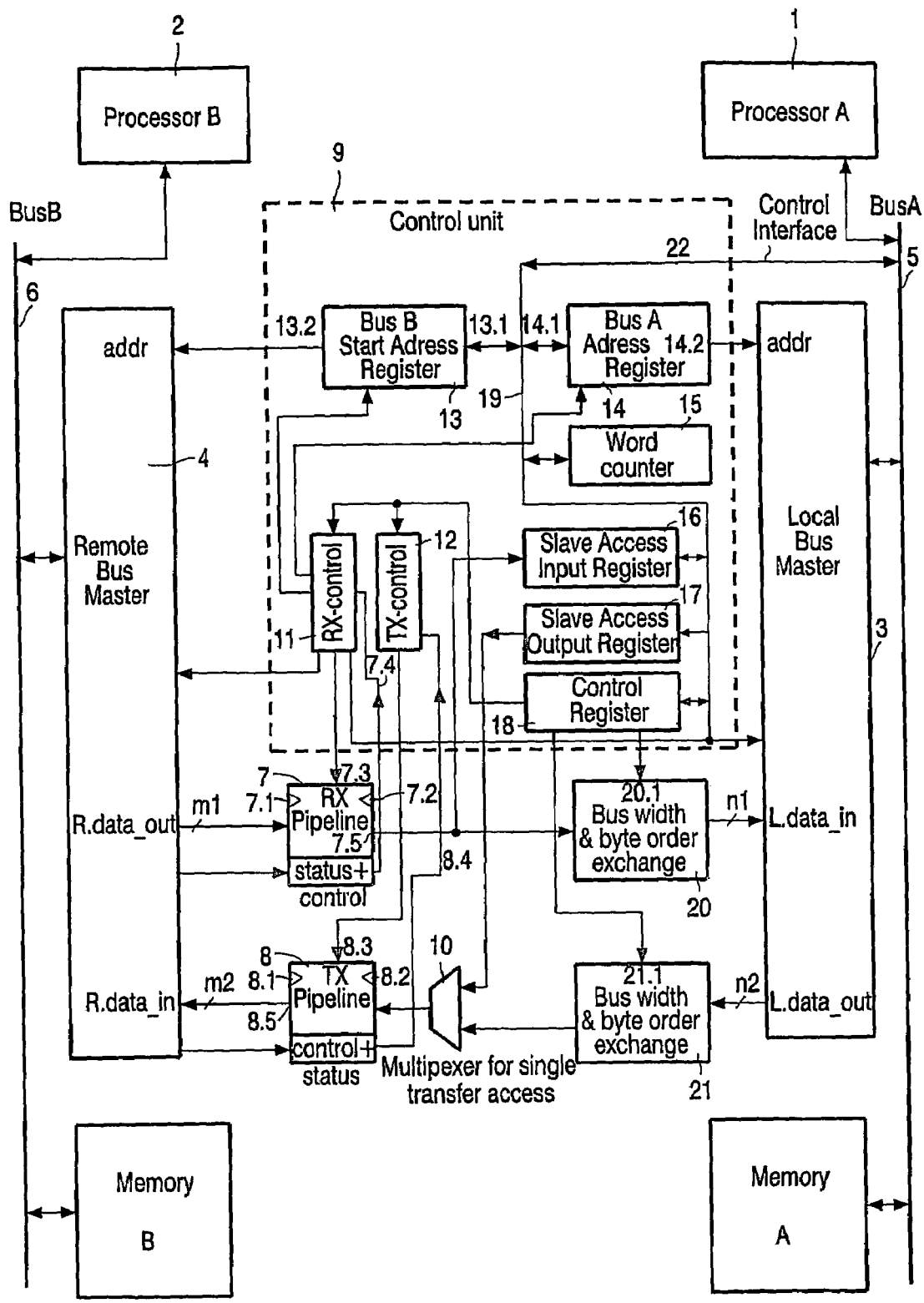

DATA PROCESSING DEVICE AND METHOD FOR TRANSFERRING DATA

The present invention relates to a data processing device and a method for transferring data form a first memory of a first processor system to a second memory of a second processor system. For example, the invention can be used for establishing a communication between two or more processors. The invention notably concerns an inter-processor communication between processors that are arranged on the same semiconductor die.

The data processing device and the method for transferring data according to the invention generally supports applications using multiple microprocessors, where fast exchange of large blocks of data between the processor cores is necessary. This includes mobile phones, networked personal digital assistants (PDAs), networking equipment or general computing equipment where different processor cores share different tasks in a system where data must cross processor boundaries.

As the demand for more powerful computing devices increases, more and more systems are offered that comprise more than just one processor.

There are systems where two or more processors are integrated on the same chip or semiconductor die. A typical example is a SmartCard that has a main processor and a crypto-processor on the same semiconductor die.

As small handheld devices are becoming more and more popular, die demand for powerful and flexible chips is increasing. A typical example is the cellular phone which in the beginning of its dissemination was just a telephone for voice transmission, i.e. for analog communication. Over the years, additional features have been added and most of today's cellular phones are designed for voice and data services. Additional differentiators are wireless application protocol (WAP) support, paging and short message system (SMS) functionality, just to name some of the more recent developments. All these features require more powerful processors and quite often even dual-processor or multi-processor chips.

In the future, systems handling digital video streams for example will become available. These systems also require powerful and flexible chip sets.

Other examples are integrated circuit cards, such as multi-purpose JavaCards, small handheld devices, such as palm top computers or personal digital assistants (PDAs), etc.

In Ghodrat et al. U.S. Pat. No. 6,266,723, a method and a system for optimizing of peripheral component interconnect PCI bus transfers is described. This method and device are particularly provided for optimizing the transfer of data on a bus in a data processing system. For this purpose, the data processing system comprises a central processing unit, a memory subsystem, a bus for receiving bus transactions for transferring data and a device connected to the bus. This device in turn comprises a bus transaction initiator which generates a bus transaction request, a bus transaction optimizer which generates a plurality of bus transaction requests in response to receiving an original bus transaction request, and wherein these requests comprise a high performance bus transaction request and a low-performance bus transaction request. The device also comprises a bus interface unit, which controls a bus transaction in response to receiving a bus transaction request.

Melo et al. U.S. Pat. No. 6,212,590 describes a computer system having an integrated bus bridge design with a delayed transaction arbitration mechanism This is employed within a laptop computer docked to an expansion base with which a high performance can be obtained. The system comprises a secondary bus bridge device in a portable computer and another secondary bus bridge device in an expansion base to which the portable computer docks. A peripheral in the expansion base may initiate a delayed cycle to read or write data to memory through a primary bus bridge device that also couples to a CPU. Both bus bridge devices include an arbiter for controlling arbitration of a peripheral bus that connects both secondary bridge devices.

In Melo et al. U.S. Pat. No. 6,279,087, a system and method for maintaining coherency and improving performance in a bus bridge supporting write posting operations is described. The bridge provides an interface between a microprocessor coupled to a processor bus, a main memory coupled to a memory bus, and a peripheral device coupled to a peripheral bus. To maintain coherency, the bridge disables posting in certain situations, and flushes posted write transactions before allowing certain read requests to be serviced. At least in Melo et al. U.S. Pat. No. 6,199,131, a computer system employing optimized delayed transaction arbitration technique is described. Disadvantageously, both methods do not allow reading and writing data at the same time.

In Pardillos U.S. Pat. No. 5,642,482, a system for network transmission using a communication coprocessor comprising a microprocessor to implement protocol layer and a microprocessor to manage direct memory access is described. The system for transmitting data between a computer bus and the network includes a general purpose unit connected to the bus and to a network-connected adapter, and further includes a first microprocessor and a unit for transferring frames between the bus and the adapter comprising a dual port memory connected there between. The system further comprises a communication coprocessor connected to the general purpose unit. The communication coprocessor includes a second microprocessor implementing for each communication layer the corresponding protocol by providing each frame with control data adapted to the protocol. The second microprocessor is connected to the first microprocessor and the dual port memory. Finally, the system includes a third microprocessor providing direct memory access management of data transfer between the second microprocessor and the dual port memory.

A disadvantage of this solution is a high latency time for block or single transfers, since the entire data block or word has to be written to the dual port memory first before it can be read out by the opposite processor. During all this time, the processors are occupied with the transfers. Another disadvantage is that firmware is involved in both processor blocks to do the transfers. Transfer functions on both sides must also be coordinated.

A further multiprocessor system is described in Honda U.S. Pat. No. 5,916,296. The dual processor automotive control system described therein comprises a host microprocessor with a read only memory (ROM), a random access memory (RAM), a central processing unit (CPU) and a direct memory access (DMA) controller. The system further comprises a knock-control system microprocessor provided with a ROM, RAM CPU and DMA controller. The host microprocessor and the knock-control system microprocessor are connected by a bi-directional communication line.

A disadvantage of this solution is that the bi-directional communication line between the two DMA controllers does not employ a pipelined buffer.

An object of the invention is to provide a data processing device and a method for transferring data form a first processor to a second processor which can exchange data at a time in both directions between both processors.

Another object of the invention is to transfer data from the one processor to the other processor wherein the latency time, this means the time between the intention to send data and the point of time the bus is available for the transfer, is as short as possible.

A further object of the invention is to optimize the performance of both processor cores. The data transfer from one processor core to the other shall not consume processor core performance and thus avoid the reduction of the overall performance of a system.

If the processor clock speeds differ significantly in a system according to the prior art, this will slow down the faster processor and reduce the performance of the whole system during the data transfer. Thus another object of the invention is to avoid a loss of processor and system performance when the processors run at different clock speeds.

A system for transferring large blocks of data versus a system for transferring only a single word of data requires a different hardware implementation. An object of the invention is also to provide a data processing device and a method for transferring data form a first processor to a second processor which can be used as well as for transferring large blocks of data as also for transferring a single word.

Once data are transferred from one subsystem with the first processor to the other subsystem with the second processor, prior art solutions often require an additional process to move the data to the desired location within the subsystem. Disadvantageously this further reduces processor performance. Therefore, a further object of the invention is to provide a data processing device and a method for transferring data from a first processor to a second processor wherein the transfer of data to the desired location within the subsystem does not influence processor performance.

The problem is solved by a data processing device with the features according to the independent apparatus claim, essentially comprising: a first processing unit linked to a first bus, a second processing unit linked to a second bus, a first bus master linked to said first bus, a second bus master linked to said second bus, communication channels linking said first and said second bus masters to each other, and a controller for the data transfer between the two bus masters via the communication channels.

An appropriate method for transferring data form a first processor to a second processor comprises the features lied out in an independent method claim. This method for transferring data from a first memory of a first processor system to a second memory of a second processor system according to the invention comprises the following steps: the first memory transmits the data via a first bus to a first pipeline controlled by a first bus master with a first clock rate; subsequently, the data are transferred from the first pipeline with the help of a second bus master with a second clock rate via a second bus to the second memory.

Advantageous further developments of the invention can be seen from the features lined out in the dependent claims.

The first and the second communication channels in the data processing device according to an embodiment of the invention comprise buffers. Thus the data transfer from one processor core to the other processor core is buffered and therefore the performance of the quicker processor is not influenced by the performance of the slower processor. Therefore the data transfer does not reduce the overall performance of the superior system In another embodiment of the data processing device according to the invention, each buffer has a first and a second clock input, wherein the first clock input is linked to the first bus master and the second clock input is linked to the second bus master. The advantage of this embodiment is, if the processor speeds are significantly different, this is not slowing down the faster processor and is not reducing the performance of the faster system during the data transfer. For example, the data can be written into the first buffer with the clock of the first processor and the data can be read out from the first buffer with the clock rate of the second processor.

In a further embodiment of the data processing device according to the invention the first bus has a first bus width and the second bus has a second bus width and the first and the second communication channels comprise an adapting unit for adapting the bus widths. This has the advantage that a data transfer is transparent to the software.

In a still further embodiment of the data processing device according to the invention the first bus has one type of byte order and the second bus has the other type of byte order. Furthermore the first and the second communication channels comprise a further adapting unit for adapting the byte orders. Thus a data transfer between the processors can be ensured even if both subsystems have different byte orders. For example, if one subsystem works with a little endian configuration and the other subsystem with a big endian configuration a communication between both subsystems is still possible.

Furthermore, the control unit of the data processing device according to the invention can comprise an output register for a single data transfer, whose input is connected to the first bus. A multiplexer is switched in one of the communication channels and connected to the slave access output register. With this, a single data transfer or a block data transfer can be realized.

It is further suggested that in the data processing device one of the processing units is a master and the other one is a slave. The control unit is connected to the master for receiving and transmitting control and status signals.

Advantageously, the control unit of the data processing device according to the invention comprises an address register generator whose input is connected to the master and whose output is connected to the first bus master, and the control unit comprises a further address register generator whose input is connected to the master and whose output is connected to the second bus master.

Furthermore, the control unit of the data processing device according to the invention can be equipped so that the addresses are incremented automatically. With that, one of the subsystems are loaded with the generation of addresses.

In a further advantageous embodiment the control unit of the data processing device according to the invention can be equipped so that the addresses are generated in ring buffer mode.

Advantageously, the control of the data processing device according to the invention unit comprises a word counter connected to the first bus.

According to a further embodiment of the invention, the control unit is equipped so that the data transfer can be suspended, if the buffer is full. With that a buffer overflow and a from that resulting loss of data can be avoided.

In another aspect of the data processing device according to the invention, the control unit is equipped so that the bus access load can be controlled such that the bus access load is kept under a predetermined value.

Furthermore, the data processing device according to the invention can be equipped so that the first processor, which is the master, can suspend the data transfer.

In another embodiment of the data processing device according to the invention, the first bus master is equipped so that it can detect an error regarding address alignment or illegal addresses and forward it to the control unit In a further embodiment of the method for transferring data according the invention, the data transfer form the second processor to the first processor comprises the following steps: the second memory transmits the data via the second bus to a second pipeline with the help of the second bus master with the second clock rate. Afterwards the data are transferred from the second pipeline with the help of the first bus master with the first clock rate via the first bus to the first memory.

The FIGURE shows a block diagram of a data processing device according to the invention.

The present invention provides an improvement of data exchange in multiprocessor systems. An embodiment of a two processor system with a local master linked through pipelining to a remote bus master is shown in the FIGURE.

The data processing device according to the invention shown in the FIGURE comprises a first processor A, indicated with the reference sign 1, which can be a central processing unit (CPU), and a second processor B, indicated with the reference sign 2, which can be for example a digital signal processor (DSP). The first processor A is linked via a first bus A, indicated with the reference sign 5, to a local bus master 3. The second processor B is linked via a second bus B, indicated with the reference sign 6, to a remote bus master 4. The system also comprises a first memory A Linked to the first bus 5 and a second memory B linked to the second bus 6.

A first subsystem includes the first processor A, the first bus A, the first memory A, and the local bus master 3. A second subsystem comprises the second processor B, the second bus B, the second memory B and the remote bus master 4.

The data transfer is carried out by two communication channels, wherein the first communication channel transfers the data from the remote bus master 4 to the local bus master 3, and the second communication channel transfers the data from the local bus master 3 to the remote bus master 4. The first communication channel is also called RX-channel, while the second communication channel is also called TX-channel. The RX-channel comprises a RX pipeline whose input is connected to the data output R_data_out of the remote bus master 4 and whose data output 7.4 is connected via an adapting unit 20 to the data input L_data_in of the local bus master 3. The TX-channel comprises a TX pipeline 8 whose input is connected via a multiplexer 10 and a second adapting unit 21 to the data output L_data_out of the local bus master 3 and whose data output 8.5 is connected to the data input R_data_in of the remote bus master 4.

The first adapting unit 20 is provided to convert the data delivered from the data output R_data_out of the remote bus master 4 in a format which is suitable for the local bus master 3. Especially if the remote bus master 4 delivers its output data on a data bus with m1 lines and the data bus of the local bus master has n1 lines, the first adapting unit 20 converts the data so that they fit to the data bus of the local bus master 3. If the remote bus master 4 delivers its output data R_data_out in a little endian format (a first byte addressing format known in the computer industry), but the local bus master 3 needs the data in the big endian format (a second byte addressing format known in the computer industry), the first adapting unit 20 converts the output data R_data_out appropriately. Whether the output data R_data_out from the remote bus master 4 have to be converted or not is decided by a control unit 9, which is linked to a control input 20.1 of the first adapting unit 20.

The second adapting unit 21 is provided to convert the data delivered from the data output L_data_out of the local bus master 3 in a format which is suitable for the remote bus master 4. If the local bus master 3 delivers its output data on a data bus with n2 lines whereas the data bus of the remote bus master has m2 lines the second adapting unit 21 converts the outgoing data so that they fit to the data bus of the remote bus master 4. If the local bus master 3 delivers its output data L_data_out in a little endian format but the remote bus master 4 needs the data in the big endian format the second adapting unit 21 converts the output data L_data_out appropriately. Analogously, this is valid also if the output data L_data_out from the local bus master 3 are delivered in the big endian format but required from the remote bus master 4 in the little endian format. Whether the output data L_data_out from the local bus master 3 have to be converted or not is decided by the control unit 9, which is linked to a control input 21.1 of the second adapting unit 21.

In the shown embodiment of the invention, the RX pipeline comprises a first in first out (FIFO) buffer 7 with two clock inputs 7.1 and 7.2. The clock input 7.1 is connected to the remote bus master 4 while the clock input 7.2 is connected to the local bus master 3. Thereby it is possible to realize an asynchronous data transfer from the remote bus master 4 to the local bus master 3. If the clock of the first processor A and the clock of the second processor B are strongly different, this is not slowing down the faster processor and is not reducing the performance of the faster subsystem during the data transfer, because the clock rates of the processors 1 and 2 are decoupled by the buffer 7. For example, the data can be written into the buffer 7 with the clock of the processor B and the data can be read out from the buffer 7 with the clock of the processor A.

To avoid a buffer underrun or a buffer overflow the buffer 7 is connected via its buffer control input 7.3 to the control output of a RX-control unit 11 of the control unit 9.

In general, the RX-control unit 11 controls the buffer 7. The RX-control unit 11 gets the status of the received data via the buffer 7 over a status line 7.4.

The TX pipeline comprises a buffer 8 with two clock inputs 8.1 and 8.2, which is also a first in first out buffer. The first clock input 8.1 of the buffer 8 is connected to the remote bus master 4 while the second clock input 8.2 of the buffer 8 is connected to the local bus master 3. Thereby it is also possible to realize a asynchronous data transfer from the local bus master 3 to the remote bus master 4. If the clock of the first processor A and the clock of the second processor B are substantially different, this is not slowing down the faster processor and is not reducing the performance of the faster subsystem during the data transfer, because the clock rates of the two processors 1 and 2 are decoupled by the buffer 8. For example, the data can be written into the buffer 8 with the clock of the processor A and the data can be read out from the buffer 8 with the clock of the processor B.

To avoid a buffer underrun or a buffer overflow of the buffer 8, it is connected over its buffer control input 8.3 with the control output of a TX-control unit 12 of the control unit 9. In general, the TX-control unit 12 controls the buffer 8. The TX-control unit 11 gets the status of the transmitted data via the buffer 8 over a status line 8.4.

The present invention provides the desired improvement by dedicating the local and the remote bus master 3 and 4 for the two buses 5 and 6 of each processor core 1 and 2. The processor performance is not inhibited since the two bus masters 3 and 4 can do the data transfer during the time the processors 1 and 2 do not need the buses 5 and 6.

The data pipeline 8 transfers the output data L_data_out on the path from the local bus master 3 to the remote bus master 4 while the data pipeline 7 transfers the output data R_data_out on the path from the remote bus master 4 to the local bus master 3. This is particularly beneficial when one of the bus masters 3 or 4 is temporarily not available to receive or transmit data to its dedicated bus 5 or 6, due to the bus 5 or 6 being not available or because the other bus 5 or 6 is not able to accept data packets in the same rate they are provided due to different subsystem clock speeds. The architecture using the data pipelines 7 and 8 allows that the two clock domains run with independent clock speeds.

Address registers 13 and 14, which cover the full address range of the bus A and the bus B, determine the subsystem address the data is transferred to or from and therefore no further data transfer is necessary. This is because the data can directly be transferred from the desired source address location to the desired destination address location.

Due to the direct memory access on each processor domain, latency time, when transferring big blocks of data, is reduced to a minimum.

Optionally the data processing unit according to the invention is also capable to transfer a single data word at a time, without the overhead of programming the complete set of registers. This is possible through a slave access data input register 16 and a slave access data output register 17 located on the control unit 9 and connected over a control unit bus 19 to the bus A.

The local bus master 3 serves the bus A and is called local bus master because it is connected to the same processor A which controls the control unit 9 via a control interface 22. The remote bus master 4 serves the bus B. Both bus masters 3 and 4 can also be named as bus interfaces. For example the bus A can be a bus with a 16 bit bus width while the bus B can have a 32 bit bus width.

The data paths of the two busses 5 and 6 are connected via the receive (RX) data pipeline 7 in one direction and the transmit (TX) data pipeline 8 in the other direction The pipelines 7 and 8 serve as buffers if bus A or bus B are not immediately available for receiving or transmitting. Writing and reading to and from the pipelines 7 and 8 is controlled by the control unit 9.

In parallel to each word transmitted and received over the data pipelines 7 and 8, control and status information is also transferred to the RX-control unit 11 and to the TX-control unit 12, respectively.

The address for the remote bus master 4 is generated by the remote bus master 4 itself. Only the initial block address, also called start address, is sent from the control unit 9 to the remote bus master 4. This is to avoid employing a pipeline also for the addresses. Since the addresses are incremental, the remote bus master 4 increments the address by itself after each transferred word.

The control unit 9 contains registers 13 and 14 for the source and destination addresses of the data to be transferred to and from.

The control unit 9 also contains a word counter 15 to determine the number of words to be transferred.

The control unit 9 further comprises a control and status register 18, which allows the controlling processor A to check the status of the transfers and to enable the data transfers via the control units 11 and 12.

Finally the control unit 9 contains a slave access data input register 16 and a slave access data output register 17, which allow the processor A to also do single data transfers without using the local bus master 3 on bus A.

Having illustrated and described a preferred embodiment for a novel data processing device and a method for data transfer, it is noted that variations and modifications in the device and the method can be made without departing from the general concept of the invention or the scope of the appended claims.

The invention claimed is:

1. A data processing device, comprising: a first processing unit linked to a first bus, a second processing unit linked to a second bus, a first bus master linked to said first bus, a second bus master linked to said second bus, a first and a second communication channel linking said first and said second bus master with each other, and a control unit controlling the data transfer between said first and said second bus master via said first and said second communication channel, wherein each of the first and the second communication channels includes one or more hardware FIFO buffers, each hardware FIFO buffer having a first clock input linked to the first bus master and a second clock input linked to the second bus master, and wherein the control unit comprises an address register generator, whose input is connected to the first processing unit and whose output is connected to the second bus master, and the control unit comprises a further address register generator whose input is connected to the first processing unit and whose output is connected to the first bus master, each of the address register generator and the further address register generator generating a sequence of incremental addresses.

2. Data processing device according to claim 1, wherein the first bus has a first bus width and the second bus has a second bus width, and the first and the second communication channels comprise an adapting unit for adapting the bus widths.

3. Data processing device according to claim 1, wherein the first bus has a first byte order and the second bus has a second byte order, and the first and the second communication channels comprise a further adapting unit for adapting the byte orders.

4. Data processing device according to claim 1, wherein the control unit comprises an output register for a single data transfer, whose input is connected to the first bus, and a multiplexer is switched in one of the communication channels (8, 21) and connected to the output register.

5. Data processing device according to claim 1, wherein one of the processing units is a master and the other one is a slave, and the control unit is connected to the master for receiving and transmitting control and status signals.

6. Data processing device according to claim 1, wherein the control unit is equipped so that the addresses for the data which shall be transferred are incremented automatically.

7. Data processing device according to claim 1, wherein the control unit comprises a word counter connected to the first bus.

8. Data processing device according to claim 1, wherein the control unit is equipped so that the data transfer can be suspended if the buffer is full.

9. Data processing device according to claim 1, wherein the control unit is equipped so that the bus access load can be controlled such that the bus access load is kept under a predetermined value.

10. Data processing device according to claim 1, being equipped so that the first processing unit, which is the master, can suspend the data transfer.

11. Data processing device according to claim 1, wherein the bus first master is equipped so that it can detect an error regarding address alignment or illegal addresses and forward it to the control unit.

* * * * *